(12) United States Patent
Conley-Lepene

(10) Patent No.: US 11,153,740 B2
(45) Date of Patent: Oct. 19, 2021

(54) SYSTEM AND METHOD FOR COLLECTING AND DISSEMINATING INFORMATION FOR ADDRESSING CRISIS CONDITIONS

(71) Applicant: Elizabeth Michea Danine Conley-Lepene, Saco, ME (US)

(72) Inventor: Elizabeth Michea Danine Conley-Lepene, Saco, ME (US)

(73) Assignees: Safe House, Saco, ME (US); Eliza LLC, Saco, ME (US); Alexis Leigh Jatekub Ramsey-Conley, Augusta, ME (US); Callie Rose Lepene, Augusta, ME (US); Kerry Eileen Roarke, Biddeford, ME (US); Karen Leigh Whitten, Saco, ME (US); Shayna Leigh Gervais, South Berwick, ME (US); Phoebe Lynn Caron, Farmington, ME (US); Maril Tyne Smith, Palo Alto, CA (US); Catherine Ann Moore, Chattanooga, TN (US)

( * ) Notice: Subject to any disclaimer, the term of this patent is extended or adjusted under 35 U.S.C. 154(b) by 0 days.

(21) Appl. No.: 17/017,619

(22) Filed: Sep. 10, 2020

(65) Prior Publication Data
US 2021/0073310 A1   Mar. 11, 2021

Related U.S. Application Data

(60) Provisional application No. 62/898,640, filed on Sep. 11, 2019.

(51) Int. Cl.
*G06F 3/048* (2013.01)
*H04W 4/90* (2018.01)
(Continued)

(52) U.S. Cl.
CPC .......... *H04W 4/90* (2018.02); *G06F 3/04817* (2013.01); *G06F 16/951* (2019.01);
(Continued)

(58) Field of Classification Search
None
See application file for complete search history.

(56) References Cited

U.S. PATENT DOCUMENTS

| | | | |
|---|---|---|---|
| 2002/0068599 A1* | 6/2002 | Rodriguez | H04M 1/2757 455/564 |
| 2015/0030146 A1* | 1/2015 | Liu | H04M 3/4931 379/201.04 |

\* cited by examiner

*Primary Examiner* — Thanh T Vu
(74) *Attorney, Agent, or Firm* — Caseiro Burke LLC; Chris A. Caseiro

(57) ABSTRACT

A system and method arranged to enable a user to access crisis-related resources and/or other resources of interest quickly and privately to the user. The system includes a downloadable computer program configured to operate on a mobile communication device and configured to access the internet. The system also includes a database of information accessible through the mobile communication device, wherein the information of the database includes crisis and/or other resource information in the form of website links, telephone number links or both. The system also includes a resource access function configured to enable the user to access a resource of the database either through a direct link to a website of the resource, a direct link to call a telephone number of the resource or both without requiring the user to conduct an internet search to find and access the resource.

2 Claims, 8 Drawing Sheets

(51) Int. Cl.
*G06F 3/0481* (2013.01)
*G06Q 50/22* (2018.01)
*G06F 16/953* (2019.01)
*H04M 1/72406* (2021.01)
*G06F 16/957* (2019.01)
*G06F 16/9535* (2019.01)
*G06F 16/951* (2019.01)
*G06F 16/954* (2019.01)
*G06F 3/0482* (2013.01)

(52) U.S. Cl.
CPC .......... *G06F 16/953* (2019.01); *G06F 16/954* (2019.01); *G06F 16/9535* (2019.01); *G06F 16/9577* (2019.01); *G06Q 50/22* (2013.01); *H04M 1/72406* (2021.01); *G06F 3/0482* (2013.01)

SYSTEM AND METHOD FOR COLLECTING AND DISSEMINATING INFORMATION FOR ADDRESSING CRISIS CONDITIONS

BACKGROUND OF THE INVENTION

1. Field of the Invention

The present invention relates to a system and a method configured to enable users to quickly and easily discover information relevant to addressing crisis conditions that such users may find themselves in including, but not limited to, abusive relationships. More specifically, the system and method are configured to provide to users through a single website that is mobile device accessible resources available them to address such crisis conditions completely, and on a timetable effective for the user. The system also provides an access option for a user to identify and access recovery resources.

2. Description of the Prior Art

The statistics associated with the range of domestic violence incidences are alarming. While not a complete recordation of those statistics. The following information puts into perspective the devastation associated with domestic violence: Every nine seconds in the US a woman is assaulted or beaten. Around the world, at least one in every three women has been beaten, coerced into sex, or otherwise abused during her lifetime. Most often, the abuser is a member of her own family. Domestic violence is the leading cause of injury to women—more than car accidents, muggings, and rapes combined. Studies suggest that up to 10 million children witness some form of domestic violence annually. Nearly 1 in 5 teenage girls who have been in a relationship said a boyfriend threatened violence or self-harm if presented with a breakup. Every day in the US, more than three women are murdered by their husbands or boyfriends. Ninety-two percent of women surveyed listed reducing domestic violence and sexual assault as their top concern. Domestic violence victims lose nearly 8 million days of paid work per year in the US alone—the equivalent of 32,000 full-time jobs. Based on reports from 10 countries, between 55 percent and 95 percent of women who had been physically abused by their partners had never contacted non-governmental organizations, shelters, or the police for help. The costs of intimate partner violence in the US alone exceed $5.8 billion per year: $4.1 billion are for direct medical and health care services, while productivity losses account for nearly $1.8 billion. Men who as children witnessed their parents' domestic violence were twice as likely to abuse their own wives than sons of nonviolent parents.

While there are resources that exist for those in crisis, it can be difficult for a user to track down a resource or resources most directly related to a person's crisis event. In addition, it may be difficult for the user to access a relevant resource in a timely and safe manner. A variety of impediments exist that make the victim's efforts to break free from a domestic violence situation or event extremely difficult. They include but are not limited to:

Emotions overrule cognitive thinking, victims often time do not know where to go, what to do, what to ask or who to ask;

Family and Friends do not know how to help;

A victim calls 911, which is a recognizable action to perpetrators and that can put the victim in even greater danger;

Resource accessibility for the victim at the time of an event and even after such an event has occurred;

We are asking why the victim did not leave sooner, instead of asking how we can get the victim out sooner;

Limited resources for legal representation in the civil realm; and

The Constitutional obligation that prevents subjecting a perpetrator to a double jeopardy condition, which is of particular concern if a first conviction attempt fails to move the perpetrator away from the victim.

Similar concerns, resource needs, and reasons for user reluctance to seek assistance can also be seen with those individuals suffering from addiction. In particular, they may not know what resources exist that can help recover from addiction, or at least to provide physical health, mental health and other sorts of counseling resources that may be needed.

Therefore, what is needed is a system and method that makes that relevant crisis resources easily identified and accessed. In certain conditions of crisis, such as an abusive relationship, for example, what is needed is a system and method that are configured to enable a user to access relevant resources without signaling to another party, such as a perpetrator of abuse, that the user is making an effort to address the crisis condition. What is also needed is a system and method that makes relevant recovery resources easily identified and accessed.

SUMMARY OF THE INVENTION

It is an object of the present invention to provide a system and method that enables easy identification of, and access to, relevant crisis resources. It is also an object of the invention to provide such a system and method that are configured to enable a user to access relevant resources without signaling to another party, such as a perpetrator of abuse, that the user is trying to address the crisis condition. Further, it is an object of the present invention to provide a system and method that are configured to enable a user to access relevant recovery resources.

These objects are accomplished with the present invention, which is a system and related method established through computer programming as a computer program configured for access through the internet. The system provides a combination of a resource identification tool and a resource contact tool. Users of the system and method tend to be individuals in a crisis condition, which may be either chronic or acute. It provides resource access through a mobile device such as a cellular phone. Individual users may download a computer application embodying the system and method. The interface links and their functions are more fully described in the accompanying set of figures.

As indicated, the system and method are established in one or more computer programs that may be implemented primarily on a mobile device but may also be accessed by any other sort of computing device that can be used to interact with the internet including, but not limited to, mainframe computers, desktop computers, tablets, and mobile devices such as smart phones, for example. The one or more computer programs are arranged to improve the function of the one or more computing devices by making relevant information collection, evaluation, and dissemination more efficient and easier for users to enable. The one or more computer programs may be referred to herein collectively as the computer program and the one or more computing devices may be referred to herein collectively as the computing device.

The system is provided based on a downloadable or a non-downloadable program accessible over the internet. The program that performs a resource identification function and a resource interaction function may be located on one or more dedicated servers, it may be internet cloud based or a combination of the two. The computer program contained in one or more applications is established in software that embody the functions identified carried out through the computing device onto which the application is loaded. The software is generated using application generation tools known to those skilled in the art of producing such programs. For example, the program may be developed by generating computer instructions embodying the functions described using an iOS tool or such other tools as are suitable for generating and modifying a user interface, data gathering and storing, data integration and access, and bug fixing. The advantages of the present invention are enabled by the functionality of the application described herein and as represented in the accompanying figures.

The invention is a computer-based system wherein device-executable instructions are further configured to cause the computer system to implement a resource identifier and link, whether for a crisis condition, a recovery need, wedding planning or any other sort of resource discovery need. The computer-based system further includes device-executable instructions configured to cause the computer system to implement the resource access function, which enables a user to contact a person or persons associated with a selected resource.

The invention is a system and method arranged to enable a user to access crisis-related resources, recovery-related resources, wedding planning resources, and/or other resource needs of interest quickly and privately to the user. The system includes a downloadable computer program configured to operate on a mobile communication device and configured to access the internet. The system also includes a database of information accessible through the mobile communication device, wherein the information of the database includes crisis, recovery, wedding, etc., resource information in the form of website links, telephone number links or both. The system also includes a resource access function configured to enable the user to access a resource of the database either through a direct link to a website of the resource, a direct link to call a telephone number of the resource or both without requiring the user to conduct an internet search to find and access the resource.

DETAILED DESCRIPTION OF THE INVENTION

Figure 1:
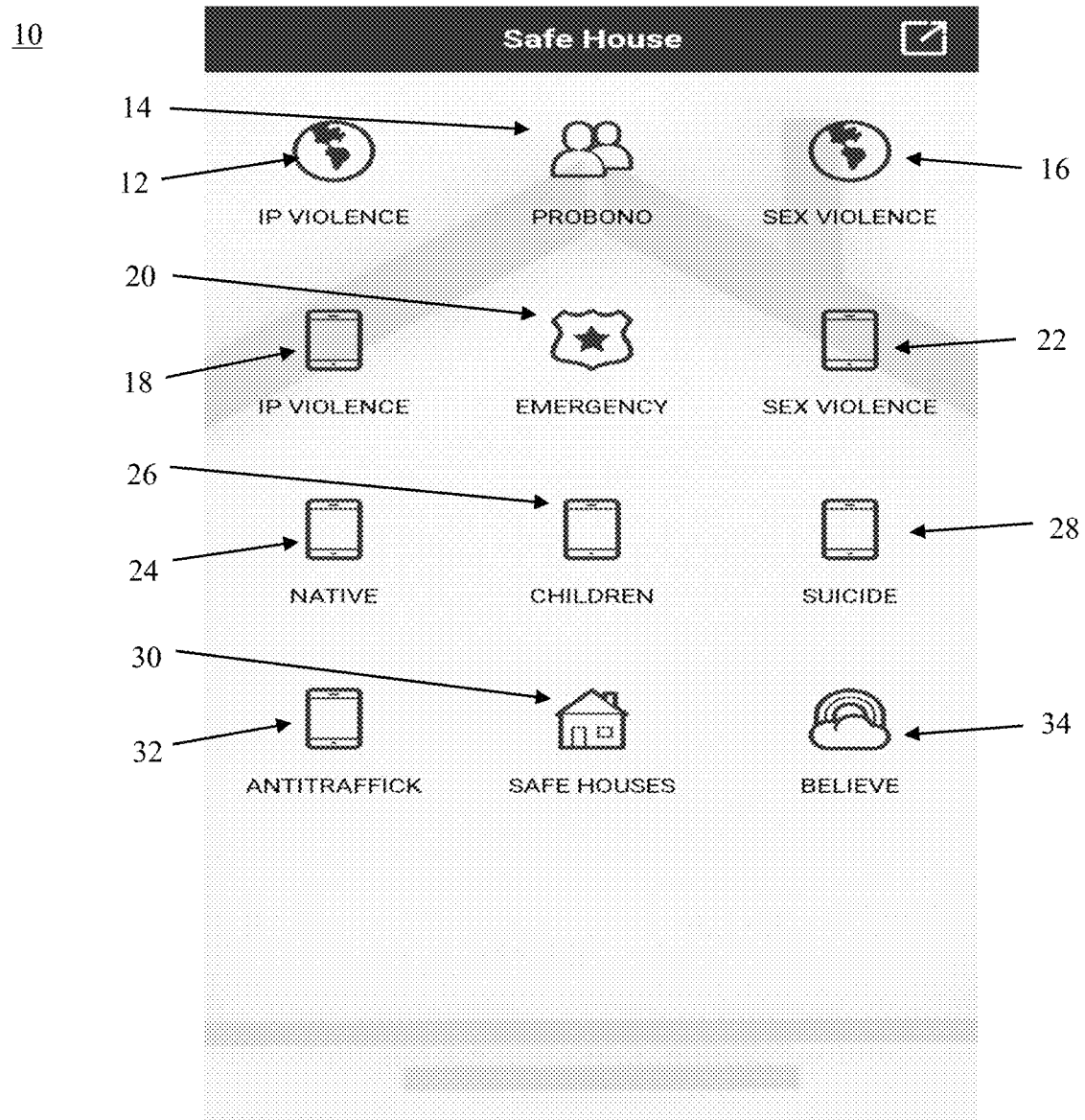
FIG. 1 is a first representation of a graphical user interface of a mobile device showing links to relevant internet-based crisis resources made accessible through the system of the present invention.

The present invention is a system and method configured to enable users to learn of and access resources available to assist in a crisis condition. The present invention also optionally provides a system and method configured to enable users to learn of and access resources available to assist a recovery need. The system of the present invention is a set of functions described in the accompanying set of figures embodied in a computing system programmed to perform functional steps associated with the method described and illustrated herein. The computing system may be associated with local or remote computing means, such as one or more central computers, such as a server in a local area network, a metropolitan area network, a wide area network, or through intranet and internet connections.

The computer system may include one or more discrete computer processor devices. Examples of known computing devices that may be suitable for use with the invention include, but are not limited to, personal computers, server computers, hand-held or laptop devices, cellular phones including smart phones, multiprocessor systems, microprocessor-based systems, set top boxes, programmable consumer electronics, network PCs, minicomputers, mainframe computers, distributed computing environments that include any of the above systems or devices, and the like. The computer system may include computer devices operated by one or more users, such as through a desktop, laptop, or servers, and/or one or more providers of services corresponding to one or more functions of the invention.

The server, the computer processor, or a combination of both may be programmed to include one or more of the functions of the invention system. One or more relational databases that may be associated with the server, the computer processor, other computing devices, or any combination thereof, include information related to the use of the invention system. For example, the database includes information associated with a specific resource, such as its location, specialty and contact data. The database of the present invention is used for gathering, storing and making accessible resource information. For the purpose of the description of the present invention, a database is a collection of stored data that are logically related. Although there are different types of databases, and the database of the present invention may be any of such types, it is preferably a relational database with a relational database management system, comprising tables made up of rows and columns. Data stored in the relational tables are accessed or updated using database queries submitted to the database system. The database may be populated and updated with information provided by an application provider capable of carrying out one or more of the steps associated with the system of the invention or any other information providers.

The invention may be described in the general context of computer-executable instructions, such as program modules, being executed by a computer. Generally, program modules include routines, programs, objects, components, data structures, etc. that perform tasks or implement abstract data types. As indicated above, the system of the present invention may also be practiced in distributed computing environments where tasks are performed by remote processing devices that are linked through a communications network or other data transmission medium. In a distributed computing environment, program function modules and other data may be in both local and remote computer storage media including memory storage devices. Storage of program instructions and database content may thereby be cloud-based as they can be stored on remote servers and accessed through internet-based connections.

The computer processor and interactive drives, memory storage devices, databases and peripherals may be interconnected through one or more computer system buses. The system buses may be any of several types of bus structures including a memory bus or memory controller, a peripheral bus, and a local bus using any of a variety of bus architectures. The computer system typically includes a variety of computer readable media. Computer readable media can be any available media that can be accessed by the computer system and includes both volatile and non-volatile media, removable and non-removable media. By way of example, and not limitation, computer readable media may be computer storage media and communication media. Computer storage media includes volatile and non-volatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system. The computer system further includes computer storage media in the form of volatile and/or non-volatile memory such as Read Only Memory (ROM) and Random Access memory (RAM). RAM typically contains data and/or program modules that are accessible to and/or operated on by the computer processor. That is, RAM may include application programs, such as the functional modules of the system of the present invention, and information in the form of data. The computer system may also include other removable/non-removable, volatile/non-volatile computer storage and access media. For example, the computer system may include a hard disk drive to read from and/or write to non-removable, non-volatile magnetic media, a magnetic disk drive to read to and/or write from a removable, non-volatile magnetic disk, and an optical disk drive to read to and/or write from a removable, non-volatile optical disk, such as a CD-ROM or other optical media. Other removable/non-removable, volatile/non-volatile computer storage media that can be used in the computer system to perform the functional steps associated with the system and method of the present invention include, but are not limited to, magnetic tape cassettes, flash memory cards, digital versatile disks, digital video tape, solid state RAM, solid state ROM, and the like.

The drives and their associated computer storage media described above provide storage of computer readable instructions, data structures, program modules and other data for the computer processor. A user may enter commands and information into the computer processor through input devices such as a keyboard, a touchpad or a pointing device such as a mouse. Other input devices may include a microphone, joystick, game pad, satellite dish, scanner, or the like. These and other input devices are connected to the computer processor through the system bus, or other bus structures, such as a parallel port, game port or a universal serial bus (USB), but is not limited thereto. A monitor or other type of display device is also connected to the computer processor through the system bus or other bus arrangement.

The computer processor may be configured and arranged to perform the described functions and steps embodied in computer instructions stored and accessed in any one or more of the manners described. The functions and steps, such as the functions and steps of the present invention described herein, individually or in combination, may be implemented as a computer program product tangibly as computer-readable signals on a computer-readable medium, such as any one or more of the computer-readable media described. Such computer program product may include computer-readable signals tangibly embodied on the computer-readable medium, where such signals define instructions, for example, as part of one or more programs that, as a result of being executed by the computer processor, instruct the computer processor to perform one or more processes or acts described herein, and/or various examples, variations and combinations thereof. Such instructions may be written in any of a plurality of programming languages, for example, XML, Java, JavaScript, Visual Basic, C, or C++, and the like, or any of a variety of combinations thereof. The computer-readable medium on which such instructions are stored may reside on one or more of the components described above and may be distributed across one or more such components.

The system and method of the present invention are embodied in a mobile computer application configured to enhance the functionality of a mobile communication device by enabling user control and access of resource information of interest quickly and without easily revealing the effort undertaken to access that information. As illustrated in FIG. 1, which is a representation of a user interface in the form of a screen display of the application on a mobile communication device 10, a user gains access to the mobile app itself by downloading it from a mobile app source. It may be possible to access the app through conventional mobile app resources such as Google® Play or Apple® iTunes; however, in order to minimize the chance that a perpetrator can discover the user's download activity, the present mobile app is preferably accessed through the IGEN app, which does not require account information for downloading, proving maximum privacy and minimal strings attached. Once the app has been downloaded, an icon depicting the app is displayed on a prior screen of the mobile app. That icon may be relatively generic or benign to reduce suspicion of its existence by a perpetrator who may be able to access the user's cell phone.

The first screen depicted after any installed authentication requirement is shown in FIG. 1 and is the primary display screen. The display depicts a plurality of radio buttons 12-34. Each radio button depicts a particular crisis resource. It is noted that one or more of the identified resources may be physically located near the user and one or more identified resources may be located regionally, nationally, or globally. Each of global radio buttons 12 and 16 represents a link to a website having information associated with the label assigned to that global radio button. It is noted that the two global radio buttons shown are intended to be representative and do not limit the number of website resource links that may be displayed and accessible using the mobile app.

Each of cell phone buttons 18, 22, 24, 26, 28, and 30 represents a link to a call that may be initiated directly to the resource house, likely a relatively local resource but not limited thereto, associated with the label assigned to that cell phone radio button. It is noted that the five cell phone radio buttons shown are intended to be representative and do not limit the number of local resources that can be called directly by actuating any of those cell phone radio buttons.

Emergency radio button 20 represents a link to a call that may be initiated directly to emergency services, such as a 911 call, without pressing the mobile device's numerical buttons to make such a call, which call might otherwise be detected by a "surfing perpetrator." Calendar radio button 14 represents access to the hours, address, and availability of a crisis resource of interest. While shown in FIG. 1 as "Pro Bono," indicative of a public service legal resource, any sort of resource calendar may be assigned a calendar radio button and is not limited to one such resource information link. However, the Pro Bono calendar resource may include, but not be limited to, information about lawyers associated with a pro bono legal resource, their schedules and availability as well as contact information. The link may further represent information about other sorts of pro bono resources with phone and/or website information that can be accessed via the mobile device.

Figure 2:
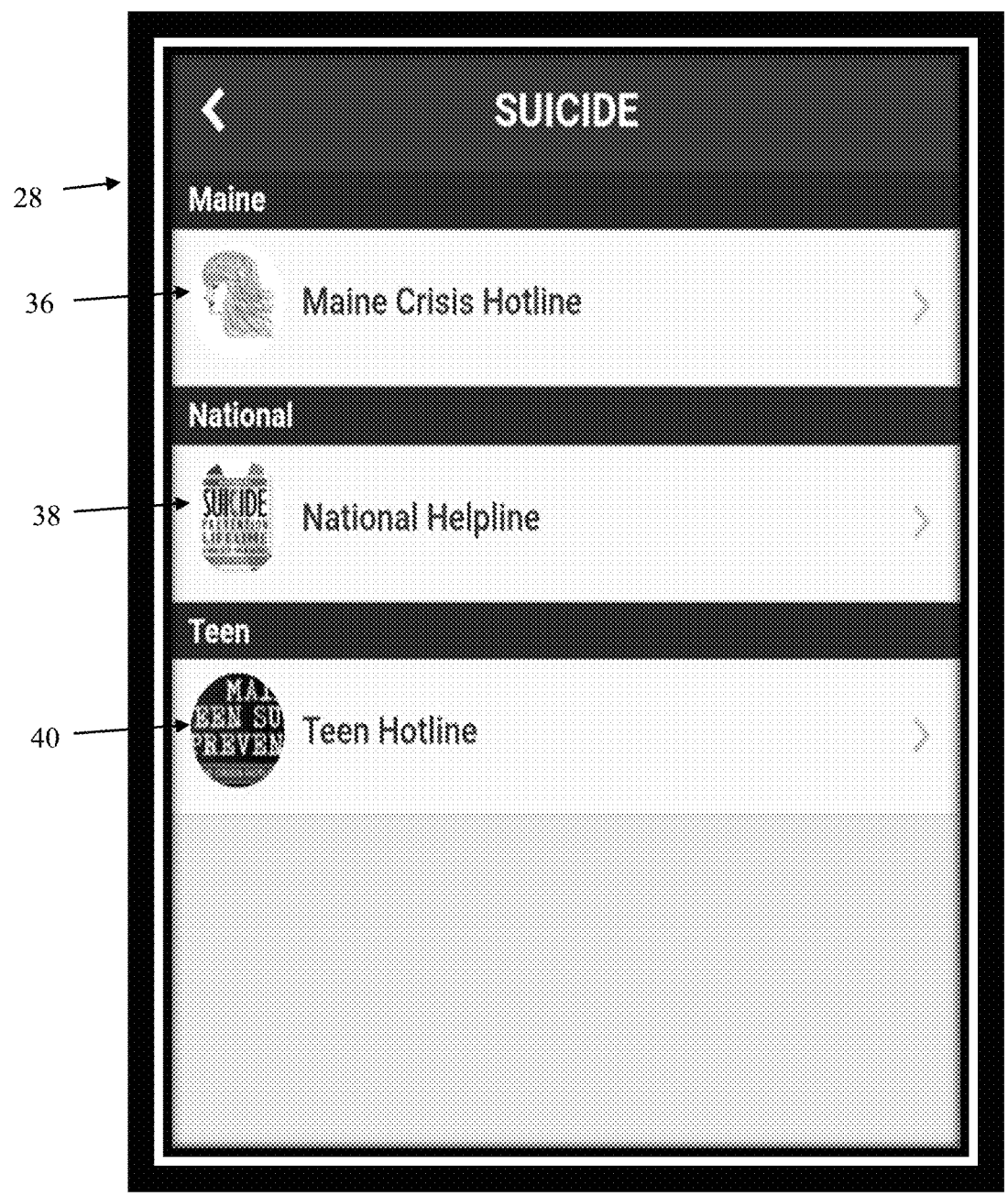
FIG. 2 is a second representation of the graphical user interface made visible to a user upon actuating one of the resource link buttons of FIG. 1.
Figure 3:
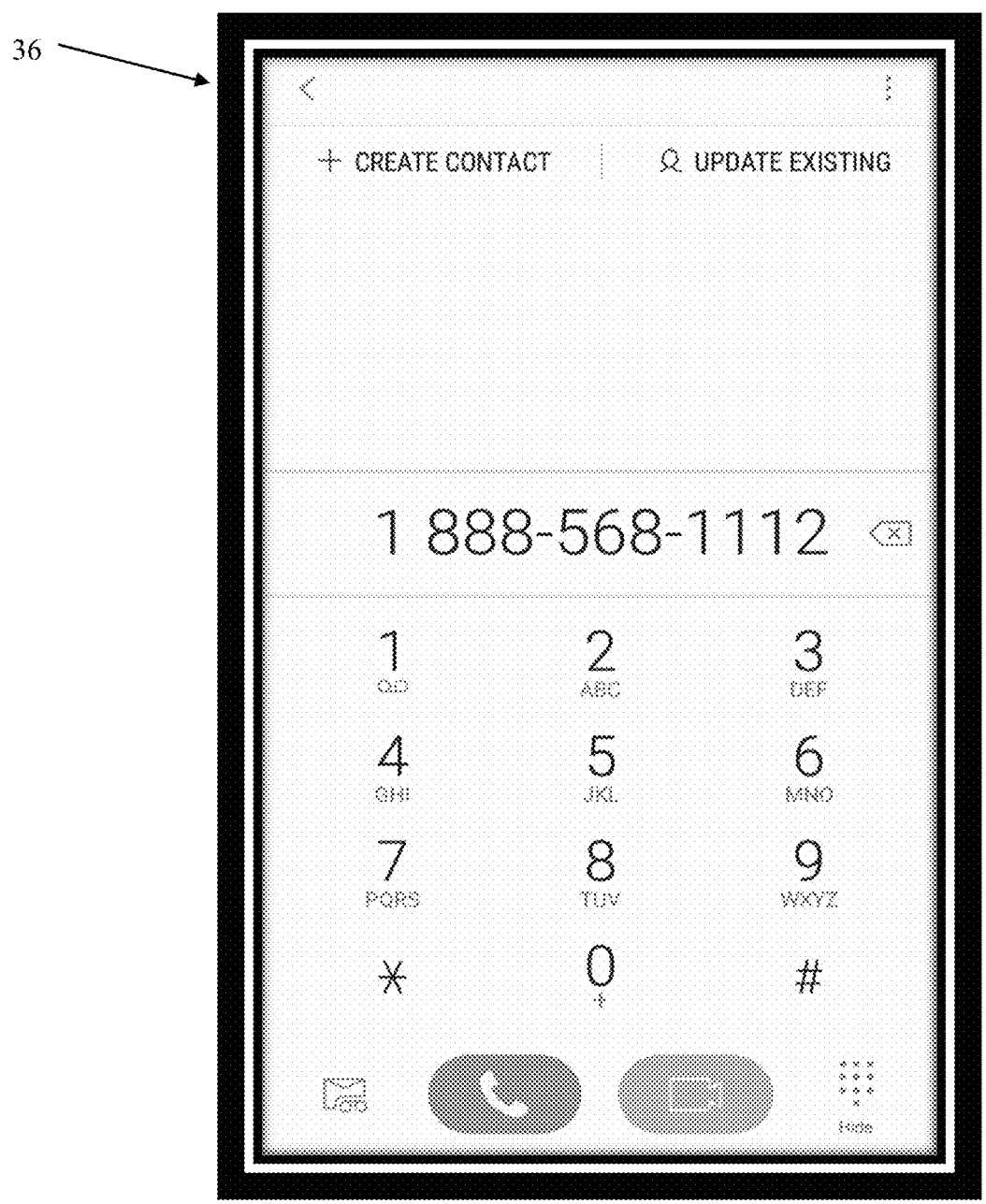
FIG. 3 is a third representation of the graphical user interface made visible to the user upon actuating the user's cell phone activation.

In FIG. 2, the display has been changed by tapping on cell phone radio button 28 of FIG. 1, which is labeled "Suicide" so as to provide the user with immediate access to internet locations relevant to a person interested in suicide-related resources. The user need only tap any of links 36, 38 and 40 to activate the user's phone application to automatically initiate a phone call to the resource represented by the links. All the user need do is tap the "send" button of their mobile app phone application as represented in FIG. 3 to proceed with the call to the selected resource. While FIG. 2 shows three example suicide-related resources, it is to be understood that different and/or additional resource call links may be established at this user interface.

Figure 4:
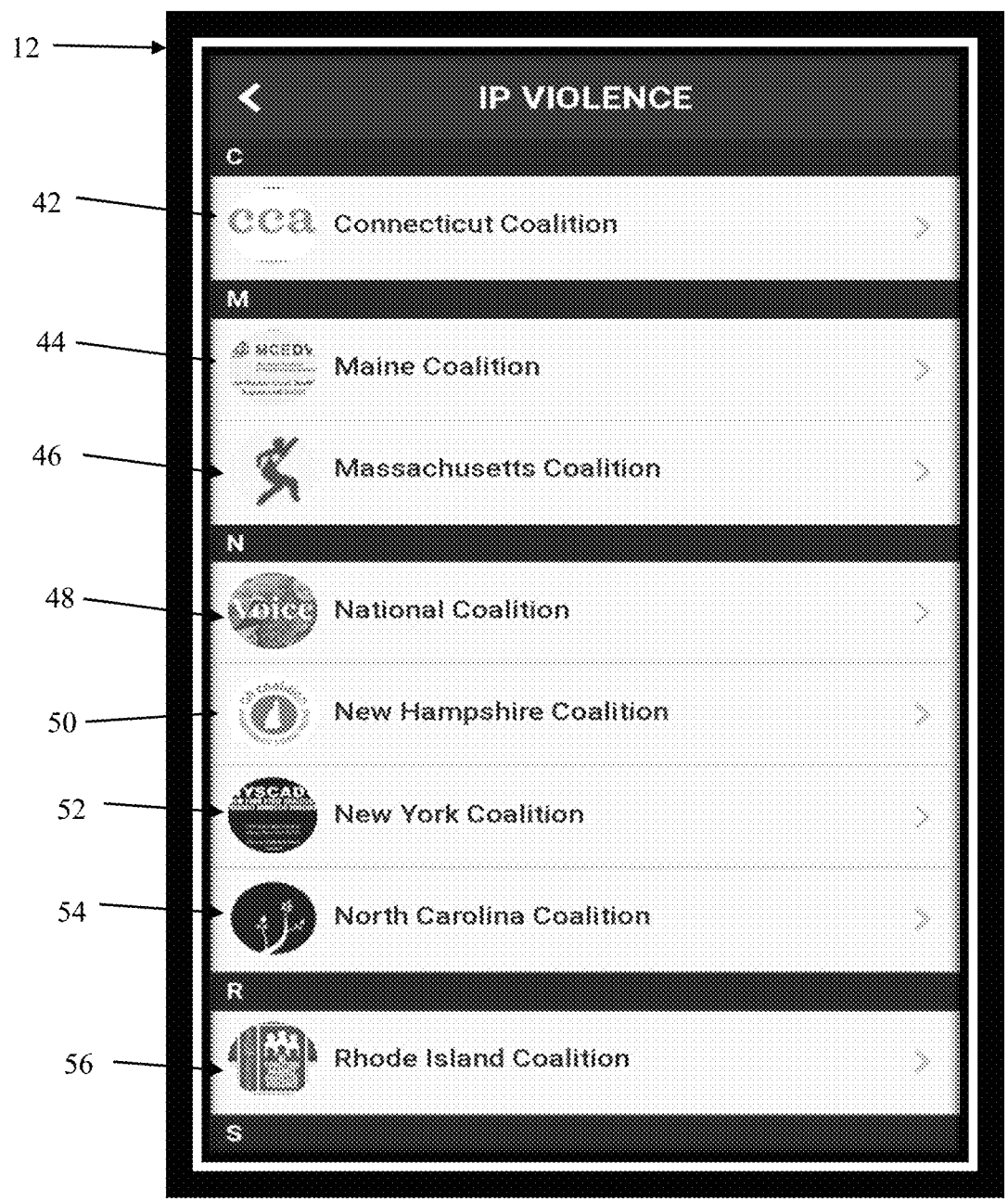
FIG. 4 is a fourth representation of the graphical user interface made visible to the user upon actuating one of the resource link buttons of FIG. 1.

In FIG. 4, the display has been changed by tapping on global radio button 12 of FIG. 1, which is labeled "IP Violence" so as to provide the user with immediate access to a log of websites associated with resources having information and capabilities to useful to a person who may be the subject of interpersonal violence. The links 42-56 represent examples of the types of websites that may be accessed by tapping global radio button 12. They are shown in FIG. 4 by location, including example state and national violence coalition resources. It is to be understood that this display is not exhaustive of the number of websites that may be accessed. By clicking on any of the links 42-56, the user is taken directly to that resource's website. This eliminates the need to do the traditional website surfing that most mobile app users employ to discover resources of interest.

Figure 5A:
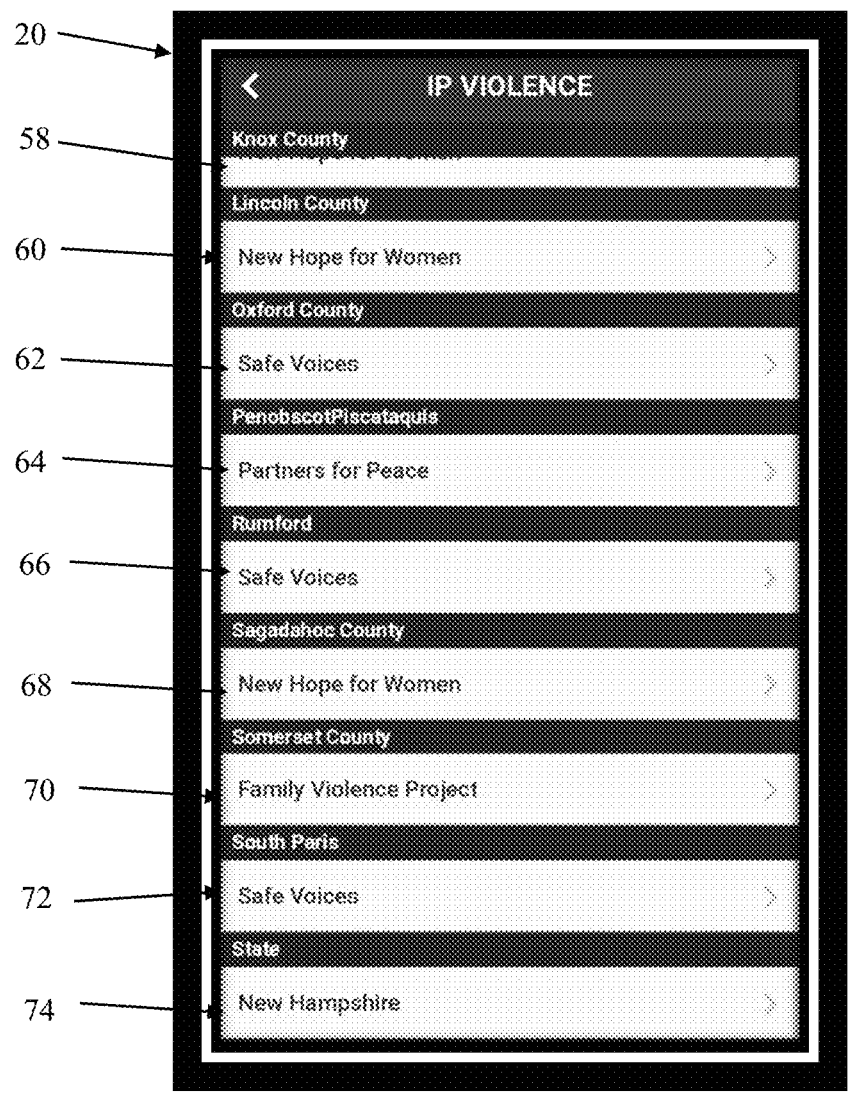
FIG. 5a is a fifth representation of the graphical user interface made visible to the user upon actuating one of the resource link buttons of FIG. 1.
Figure 5B:
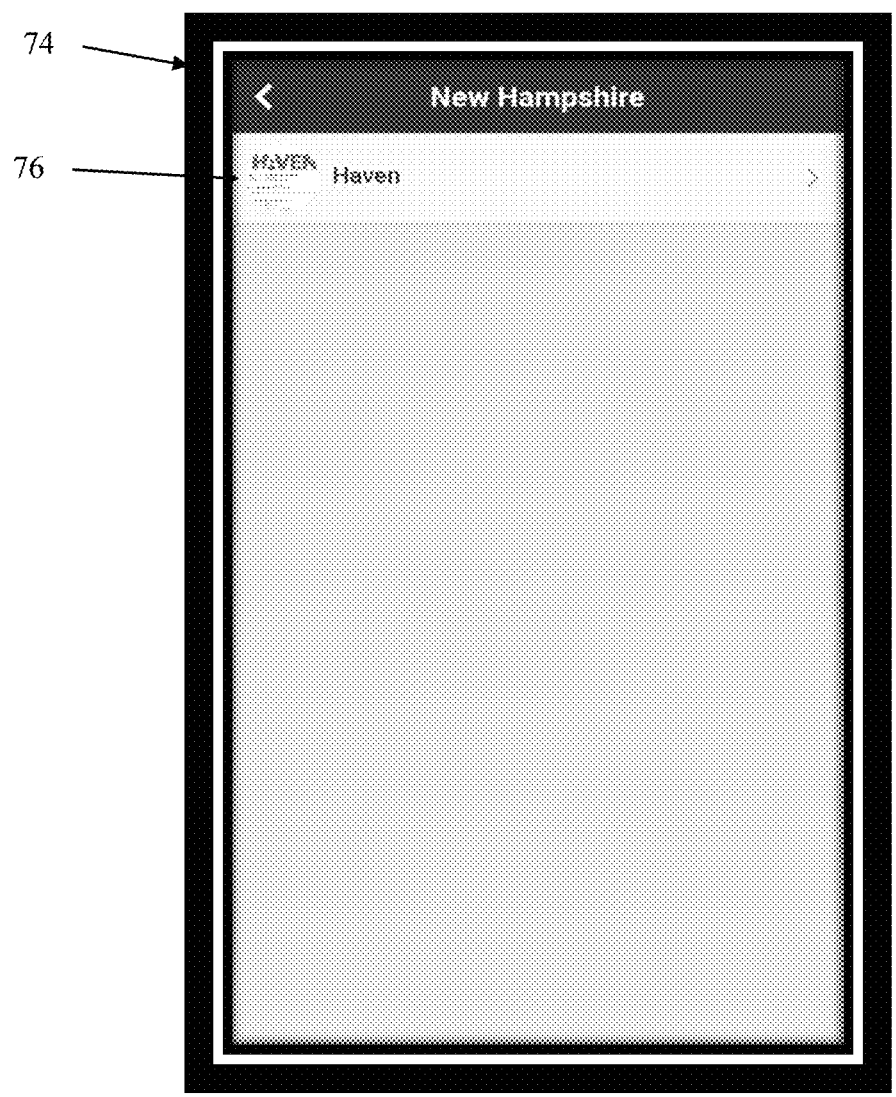
FIG. 5b is a sixth representation of the graphical user interface made visible to the user upon actuating one of the resource link buttons of FIG. 5b.

In FIG. 5a, the display has been changed by tapping on cell phone radio button 22 of FIG. 1, which is labeled "IP Violence" so as to provide the user with immediate access to internet locations relevant to a person interested in interpersonal violence-related resources. The display shows a set of links that identify specific local, state, or federal resources assigned to assist individuals having interpersonal violence concerns. While FIG. 5a illustrates particular county resources located in the state of Maine and a New Hampshire state resource link, it is to be understood that the mobile app is configured to enable access to other such agency resources dependent upon the user's location. The user need only tap any of links 58-74 to activate the user's phone application to automatically initiate a phone call to the resource represented by the links. All the user need do is tap the "send" button of their mobile app phone application, such as represented in FIG. 3, to proceed with the call to the selected resource. FIG. 5b shows the option of an additional link set when the number of resources represented in FIG. 5a cannot be shown fully. In particular, FIG. 5a shows link 76 that is displayed if the user taps a higher-level link, such as link 74 in this case for the example of interpersonal violence resources available in New Hampshire. The links shown in FIGS. 5a and 5b may further be employed to access safe locations for the user in their local area also by tapping those links and provided the particular resource accessed has that functionality available via their website.

Returning to FIG. 1, tapping on cell phone radio button 24 of FIG. 1, which is labeled "Native," provides the user with immediate access to internet locations relevant to a person interested specifically in Native American interpersonal violence-related resources. The user need only tap that link 24 to activate the user's phone application to automatically initiate a phone call to the resource represented by the link. All the user need do is tap the "send" button of their mobile app phone application, such as represented in FIG. 3, to proceed with the call to the selected resource. While link 24 may only be used by a person having an association with a particular local tribe, it is to be understood that the icon shown is only representative and other links for access to very specific resources of interest to the particular user may also be established through the present mobile app.

Tapping on resource radio button 30 of FIG. 1, which is labeled "Anti Traffick," provides the user with immediate access to internet locations relevant to a person interested specifically in sex trafficking-related resources. The user need only tap that link 30 to access content such as a log of relevant organizations. Clicking on a particular organization name brings the user to information associated with that organization, including for example, a website and/or a phone number. By tapping on a phone number of that organization, the user's phone application is activated to automatically initiate a phone call to the resource represented by the link. All the user need do is tap the "send" button of their mobile app phone application, such as represented in FIG. 3, to proceed with the call to the selected resource. It is to be understood that the icon shown as link 30 is only representative of a sex violence assistance resource and other links for access to very specific resources of interest to the particular user may also be established through the present mobile app.

Tapping on resource radio button 26 of FIG. 1, which is labeled "Children," provides the user with immediate access to internet locations relevant to a person interested specifically in resources that may provide useful information to assist children or with children including, for example, a poison control center phone number. The user need only tap that link 26 to access content such as a log of relevant children assistance resources. Clicking on a particular resource brings the user to information associated with that location, including for example, a website and/or a phone number. By tapping on a phone number of that organization, the user's phone application is activated to automatically initiate a phone call to the resource represented by the link. All the user need do is tap the "send" button of their mobile app phone application, such as represented in FIG. 3, to proceed with the call to the selected location. It is to be understood that the icon shown as link 26 is only representative of an example housing resource and other links for access to very specific housing resources of interest to the particular user may also be established through the present mobile app.

Tapping on resource radio button 32 of FIG. 1, which is labeled "Safe Houses," provides the user with immediate access to internet locations relevant to a person interested specifically in any non-governmental housing resources. The user need only tap that link 32 to access content such as a log of relevant locations with private housing availability. Clicking on a particular housing resource brings the user to information associated with that location, including for example, a website and/or a phone number. By tapping on a phone number of that organization, the user's phone application is activated to automatically initiate a phone call to the resource represented by the link. All the user need do is tap the "send" button of their mobile app phone application, such as represented in FIG. 3, to proceed with the call to the selected location. It is to be understood that the icon shown as link 26 may be expanded to include subsets by state.

Tapping on global radio button 16 of FIG. 1, which is labeled "Sex Violence," provides the user with immediate access to a log of websites associated with resources having information and capabilities to useful to a person who may be the subject of sex violence. The link provides access to relevant coalition websites. By clicking on link 16, the user is taken to any selected website including any applicable phone number. This eliminates the need to do the traditional website surfing that most mobile app users employ to discover resources of interest.

Tapping on cell phone radio button 22 of FIG. 1, which is labeled "Sex Violence," provides the user with immediate access to internet locations relevant to a person interested specifically in sex violence-related resources. The user need only tap that link 22 to activate the user's phone application to automatically initiate a phone call to the resource represented by the link. All the user need do is tap the "send" button of their mobile app phone application, such as represented in FIG. 3, to proceed with the call to the selected resource.

Tapping on resource radio button 34 of FIG. 1, which is labeled "Believe," provides the user with immediate access to a compendium of internet locations relevant to a person interested in any sort of crisis assistance resources not expressly identified with any other radio button of the main display. Should the user review the set of icons displayed and not readily observe a source they believe is applicable to their need, the user need only tap that link 34 to access content such as a log of relevant locations with crisis assistance capability. Clicking on a particular resource that this link displays brings the user to information associated with that location, including for example, a website and/or a phone number. By tapping on a phone number of that organization, the user's phone application is activated to automatically initiate a phone call to the resource represented by the link. All the user need do is tap the "send" button of their mobile app phone application, such as represented in FIG. 3, to proceed with the call to the selected location. It is to be understood that the icon shown as link 34 may be expanded to include subsets by state, county, and other combinations that are suitable and effective.

Figure 6:
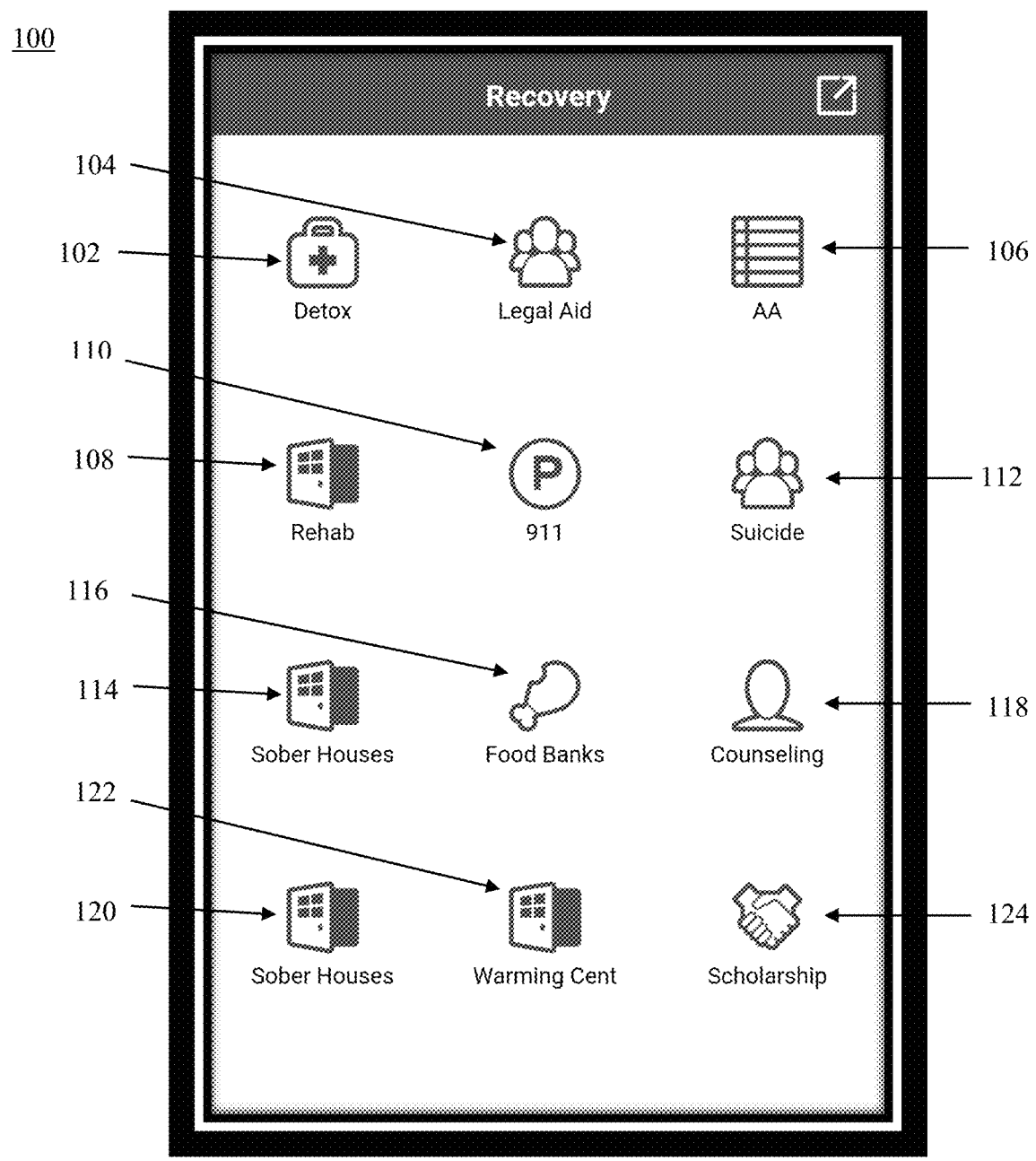
FIG. 6 is a representation of a graphical user interface of a mobile device showing links to relevant internet-based recovery resources made accessible through the system of the present invention.

An alternative version of the crisis-centric resource tool represented by FIGS. 1-5b, is shown in FIG. 6. Display 100 provides access through icons 102-124 to a resource set focused on recovery concerns. Specifically, for an individual having the need to deal with an addiction of whatever form, the mobile app of the present invention provides the same type of easy-to-access and private mechanism for the individual to make contact with one or more resources that can assist with that effort. Some of the icons and, therefore, resources, may overlap a bit with the radio buttons and resources associated with crisis needs as previously described herein. The icons 102-124 include either or both of access to resource websites and resource telephone numbers that can be accessed without the obligation to go through extensive web surfing to find them. Phone calls may be activated as has been described with respect to FIGS. 2 and 3. The recovery resources shown in FIG. 6 are examples and not intended to be limiting.

Figure 7:
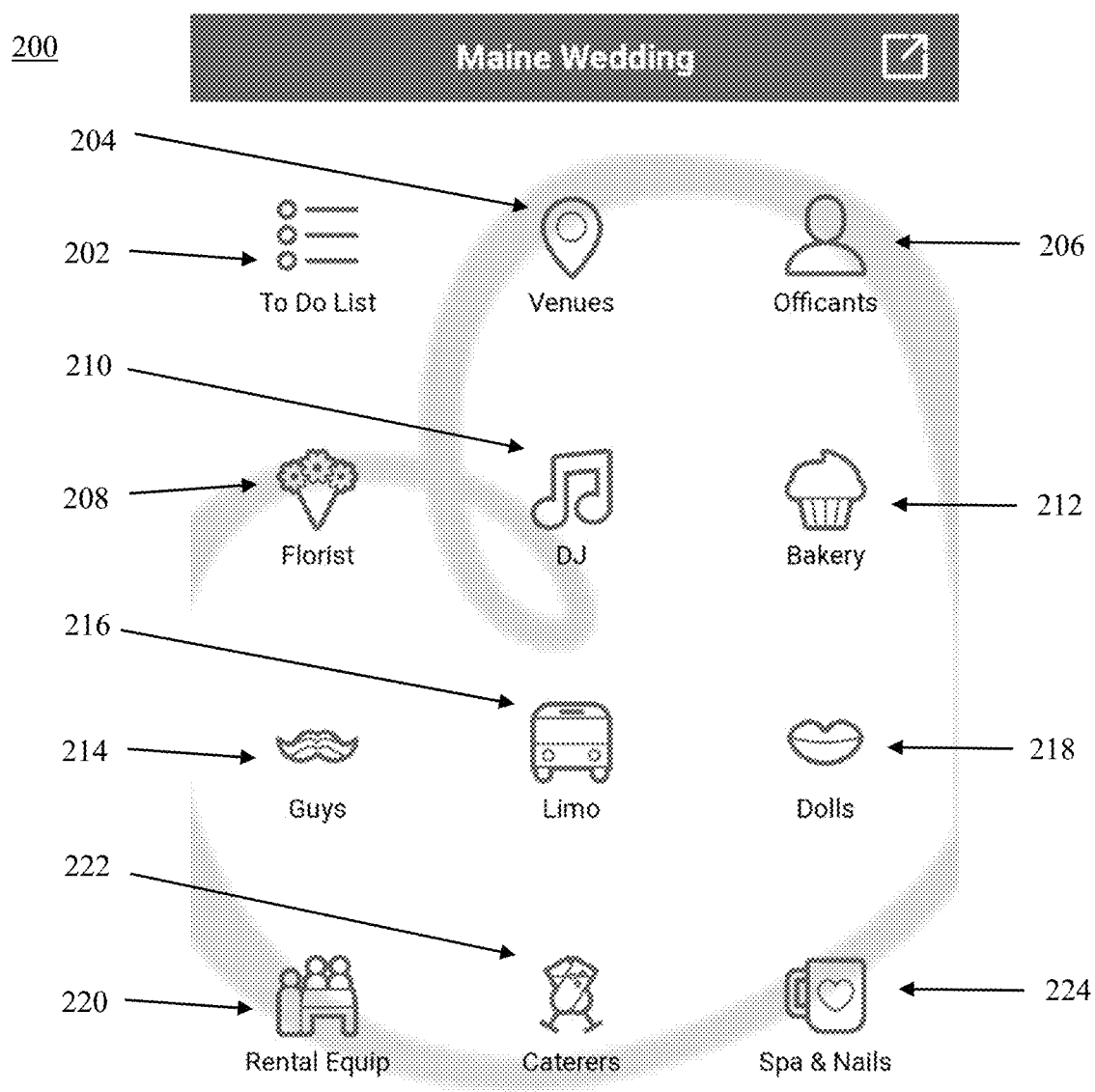
FIG. 7 is a representation of a graphical user interface of a mobile device showing links to relevant internet-based wedding planning resources made accessible through the system of the present invention.

Another alternative version of the crisis-centric resource tool represented by FIGS. 1-5b, is shown in FIG. 7. Display 200 provides access through icons 202-224 to a resource set focused on resources associated with planning of a wedding. Specifically, for an individual or individuals having the need to plan and carry out a wedding, whether as a direct wedding participant or as a wedding planner, the mobile app of the present invention provides the same type of easy-to-access mechanism for the individual to make contact with one or more resources that can assist with that effort. The icons 202-224 include either or both of access to resource websites and resource telephone numbers that can be accessed without the obligation to go through extensive web surfing to find them. Phone calls may be activated as has been described with respect to FIGS. 2 and 3. For example, if the user wishes to locate a disc jockey to play music at the wedding, the person would tap icon 210 and be immediately presented with a display of one or more music playing resources that could be contacted directly. The wedding planning resources shown in FIG. 7 are examples and not intended to be limiting. This version of the present invention would be helpful in reducing the time to discover resources of interest, make contact with such resources, and likely reduce the expense associated with carrying out the wedding process.

It is to be noted that the concept of the present invention is to provide users with direct access to resources of interest without going the current effort that exists of weeding through an array of applicable and less-than-applicable results, which mixed results must have to be waded through to discover that most useful to the individual. The present invention takes that excess and uncertain activity to a much more manageable level, whether for critical conditions such as the crises described herein, or other difficult-to-access resource needs, such as wedding planning.

Having thus described the system and method of the present invention in an exemplary form, it is to be understood that various alterations, modifications, and improvements are contemplated by the invention without deviating from its scope and spirit.

What is claimed is:

1. A mobile communication system including a mobile communication device configured to carry out through processor executable instructions using computer-implemented functions to improve operation of the computing system to enable a user to quickly and privately access crisis-related resources of interest to the user, the system comprising:
   a computer program configured to operate on the mobile communication device through the processor and configured to access the internet and having stored thereon computer-executable instructions configured to cause the computer device to implement instructions;
   a database of information accessible through the mobile communication device, wherein the information of the database includes crisis resource information for a plurality of crisis resources in the form of direct website links, direct telephone number links or both;

a graphical user interface icon representing the computer program as a computer application accessible through the mobile communication device; and a resource access function accessed on the mobile communication device through the graphical user interface icon, wherein the resource access function is configured to enable the user to access the crisis resource information by selecting a crisis resource icon on the mobile communication device from a plurality of crisis resource icons representing a crisis resource of interest, wherein the plurality of crisis resource icons includes a plurality of global radio buttons for a set of accessible crisis resources, and a plurality of cell phone radio buttons for a set of links for crisis resource calling, wherein each of the cell phone radio buttons is configured to enable the user to tap one of the cell phone radio buttons to initiate a direct call to a selected crisis resource associated with the tapped cell phone radio button, wherein each of the plurality of global radio buttons is configured to enable the user to tap at least one of the global radio buttons to access a display showing a first set of location links by state for crisis resources associated with the tapped global radio button that are located within one or more states of the first set of location links, wherein each of the first set of location links is configured to enable the user to tap at least one of the first set of location links to access a display showing a second set of location links by county for crisis resources associated with the tapped global radio button that are located within one or more counties of the second set of location links, and wherein each of the second set of location links is configured to enable the user to tap at least one of the second set of location links to access one or more crisis resources within the one or more counties to observe one or more crisis resource links located within a selected one of the one or more counties, and wherein the user can tap any of the one or more crisis resource links to initiate a direct call to a tapped crisis resource link located within the selected county.

2. The mobile communication system of claim 1, wherein the plurality of global radio buttons includes buttons associated with resources for interpersonal violence, suicide, sex violence, and housing.

* * * * *